(12) United States Patent
Verma et al.

(10) Patent No.: US 7,908,164 B1
(45) Date of Patent: Mar. 15, 2011

(54) SPOT MARKET PROFIT OPTIMIZATION SYSTEM

(75) Inventors: Sushil Kumar Verma, Redwood City, CA (US); Robert D. Pierce, Albany, CA (US); Hau Leung Lee, Los Altos, CA (US); Charles R. Troyer, New York, NY (US)

(73) Assignee: SignalDemand, Inc., San Francisco, CA (US)

( * ) Notice: Subject to any disclaimer, the term of this patent is extended or adjusted under 35 U.S.C. 154(b) by 1562 days.

(21) Appl. No.: 11/200,548

(22) Filed: Aug. 9, 2005

(51) Int. Cl.
*G06Q 99/00* (2006.01)

(52) U.S. Cl. .............. 705/10; 705/7; 705/400; 700/100; 700/106

(58) Field of Classification Search .................. 705/1, 7, 705/10, 28, 36, 400, 1.1; 700/100, 103
See application file for complete search history.

(56) References Cited

U.S. PATENT DOCUMENTS

| | | | |
|---|---|---|---|
| 5,287,267 A * | 2/1994 | Jayaraman et al. ............ 705/10 |
| 5,604,854 A | 2/1997 | Glassey | |
| 5,926,822 A | 7/1999 | Garman | |
| 6,092,050 A | 7/2000 | Lungren et al. | |
| 6,167,380 A * | 12/2000 | Kennedy et al. ............... 705/10 |
| 6,456,982 B1 | 9/2002 | Pilipovic | |
| 6,553,352 B2 | 4/2003 | Delurgio et al. | |
| 6,851,604 B2 | 2/2005 | Girotto et al. | |
| 6,865,542 B2 * | 3/2005 | Cox et al. ........................ 705/10 |
| 6,892,195 B2 | 5/2005 | Lee et al. | |
| 7,069,101 B1 * | 6/2006 | Arackaparambil et al. .. 700/121 |
| 7,117,164 B2 * | 10/2006 | Slocum ............................ 705/10 |
| 7,249,068 B1 * | 7/2007 | Kakouros et al. ............... 705/28 |
| 7,415,428 B2 * | 8/2008 | Garwood ......................... 705/26 |
| 7,437,323 B1 * | 10/2008 | Valkov et al. ............... 705/36 R |
| 7,552,095 B2 * | 6/2009 | Kalyan ............................. 705/7 |

(Continued)

FOREIGN PATENT DOCUMENTS

JP          09073491 A  *  3/1997

OTHER PUBLICATIONS

Goel et al. "Integrating Spot and Future Commodity Markets in the Optimal Procurement Policy of an Assemble-to-Order Manufacture", Jun. 12, 2004, University of Texas, Austin, 40 pgs.*

(Continued)

*Primary Examiner* — John W Hayes
*Assistant Examiner* — Freda A Nelson
(74) *Attorney, Agent, or Firm* — Treyz Law Group; G. Victor Treyz; Nancy Y. Ru

(57) ABSTRACT

A profit optimization system takes account of supply-side and demand-side factors in optimizing profit for an organization. The profit optimization system uses an optimization model to optimize profit in a spot market. The model takes into account which parts the organization uses to assemble various products. Demand curves are used to characterize the quantity of each product that will be demanded as a function of price on the spot market. Supply model data is used to determine which mix of products can be sold in view of parts availability. Using the demand model and supply model data, the optimization model can recommend a set of prices to use for selling the organization's products. The model ensures that the organization has sufficient resources available to produce the products and enforces user-supplied business rules and other constraints.

18 Claims, 12 Drawing Sheets

U.S. PATENT DOCUMENTS

| | | | |
|---|---|---|---|
| 7,590,937 B2 * | 9/2009 | Jacobus et al. | 715/700 |
| 7,627,850 B2 * | 12/2009 | Kennedy et al. | 717/105 |
| 2001/0037321 A1 | 11/2001 | Fishman et al. | |
| 2003/0110072 A1 | 6/2003 | Delurgio et al. | |
| 2005/0159989 A1 * | 7/2005 | Tsuno et al. | 705/7 |

OTHER PUBLICATIONS

Seifert et al., "Optimal Procurement Strategies for Online Spot Markets", Sep. 16, 2002, European Journal of Operational Research, 19 pgs.*

Chu et al., "Take-or-Pay Contracted Assembly System with Random Demand", Dec. 14-17, 2004, $43^{rd}$ IEEE Conference on Decision and Control, 6 pgs.*

Goel et al. "Integrating Spot and Future Commodity Markets in the Optimal Procurement Policy of an Assemble-to-Order Manufacture", Jun. 12, 2004, University of Texas, Austin, 40 pgs.*

Chu et al., "Take-or-Pay Contracted Assembly System with Random Demand", Dec. 14-17, 2004, $43^{rd}$ IEEE Conference on Decision and Control, 6 pgs.*

* cited by examiner

GENERIC PIECE CODES

CHUCK EYE ROLL
LOIN TAIL
..
..
..
..

FIG. 2

ASSEMBLIES
(SUBSET OF ATTRIBUTED SOURCE
CODES X GENERIC ASSEMBLY CODES)

CH-ANG-A ; 1101

CH-WHT-A ; 1101

CH-ANG-A ; 1102

PARTS
(SUBSET OF ATTRIBUTED SOURCE
CODES X GENERIC PIECE CODES)

PARTS
(Destination Codes X Atomic Codes)

CH_ANG_A; CHUCK EYE ROLL
CH_WHT_A; CHUCK EYE ROLL
CH_ANG_A; LOIN TAIL
CH_WHT_A; LOIN TAIL
..
..
..
..

| Assembly Code | Constituent Part Codes | Quantity |
|---|---|---|
| Assembly Code 1 | Part Code 1<br>Part Code 2<br>Part Code 3 | 1<br>1<br>2 |
| Assembly Code 2 | Part Code 1<br>Part Code 3 | 1<br>2 |
| ..<br>..<br>..<br>.. | | |

FIG. 7

| Product Code | Alternate Assembly Codes |
|---|---|
| Product Code 1 | Assembly Code 1<br>Assembly Code 2 |
| Product Code 2 | Assembly Code 2<br>Assembly Code 3 |
| ..<br>..<br>..<br>.. | |

FIG. 8

SPOT MARKET PROFIT OPTIMIZATION SYSTEM

BACKGROUND OF THE INVENTION

This invention relates to tools for optimizing profits, and more particularly, to tools for determining how best to optimize profits when manufacturing and selling products that are to be sold in a spot market.

Business planning tools are currently available to assist an organization in maximizing its profits. In a typical scenario, an organization might use a forecasting model to predict the quantity of a product that will be sold at some time in the future. By predicting demand in this way, the organization can order sufficient materials to produce the predicted quantity of product that will be sold.

Although simple demand forecasts of this type are useful, they do not take account of supply and demand factors in an integrated fashion. For example, conventional forecasts do not take into account demand elasticity and the different profit margins of different products that can be assembled from the same parts. As a result, traditional planning tools do not allow organizations to truly maximize profit.

There is therefore a need for improved business planning tools to help an organization maximize profits.

SUMMARY OF THE INVENTION

In accordance with the present invention, a system is provided for assisting organizations in maximizing their profit when assembling and selling various products in a spot market. With this type of environment, products must be assembled from available parts, because there is insufficient time to obtain parts from far up the organization's supply chain. In a typical scenario, the available parts are primarily obtained from inventory (i.e., the majority of the parts used are already in the inventory of the organization). Supply inventory may be considered to include materials scheduled for delivery and use during a given production period.

The system uses an optimization model to determine which prices an organization should use in selling its products. Suggested spot sales prices and associated spot sales quantities are produced by the model. The optimization model ensures that the proposed sales prices that are generated have an associated feasible production plan. This ensures that the organization can assemble the projected quantities of products that will be sold from available parts.

The optimization model preferably enforces user-supplied business rules. For example, the organization may require that a high-grade product sell for a price that is higher than a low-grade product. The optimization model also preferably takes account of oversold quantities and desired lower bound sales quantities. By considering constraints such as these, the organization may ensure that its business reputation is maintained.

If desired, the optimization model may produce a production plan for use by the organization. The production plan may specify the quantity of parts that are to be used to fabricate each product.

Further features of the invention, its nature and various advantages will be more apparent from the accompanying drawings and the following detailed description of the preferred embodiments.

BRIEF DESCRIPTION OF THE DRAWINGS

FIG. 2 is an illustrative list of generic piece codes that may be used in the meat packing industry to identify a most granular cut of meat in accordance with the present invention.

FIG. 5 is a list of illustrative assemblies that may be formed using the attributed source codes of FIG. 3 and the generic assembly codes of FIG. 4 in accordance with the present invention.

FIG. 6 is a list of illustrative parts that may be formed using the generic piece codes of FIG. 2 and the attributed source codes of FIG. 3 in accordance with the present invention.

FIG. 7 is an illustrative table that may be used to map part codes to assemblies in accordance with the present invention.

FIG. 8 is an illustrative table that may be used to map assembly codes to product codes in accordance with the present invention.

DETAILED DESCRIPTION OF THE PREFERRED EMBODIMENTS

Figure 1:
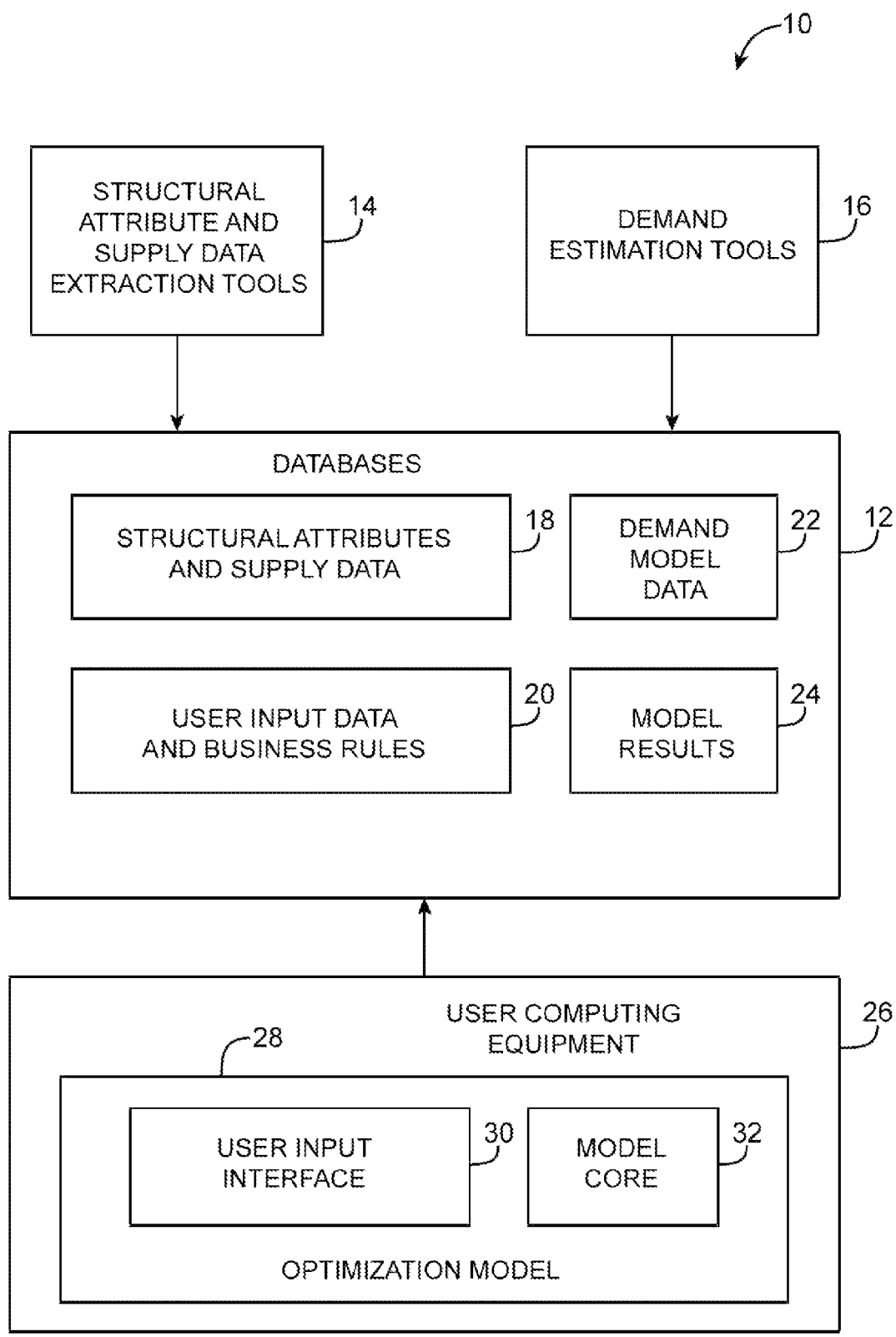
FIG. 1 is a diagram of an illustrative system environment in which an integrated demand and supply optimization model operates in accordance with the present invention.

The present invention relates to modeling systems and methods that are used by businesses to optimize their profits. The optimization techniques of the present invention apply particularly to the manufacture and sale of products that must be cleared in a relatively short period of time. This type of market environment is typically referred to as a spot market.

The optimization techniques of the present invention take into account various tradeoffs and constraints faced by an organization. One tradeoff that is considered relates to demand elasticity. Most products have an elastic demand in that the quantity of the product that is sold increases as a function of decreasing price. If Q represents the quantity of a product sold and P represents its price, the slope of the Q versus P demand curve is its elasticity. Traditionally elasticity is measured as a unitless ratio: $-(dQ/dP)(P/Q)$. Because demand for most products is elastic, there is a tradeoff between the selling price for a product and the likelihood of selling that product. The amount of product that can be moved through a sales channel therefore increases as price is reduced.

Another tradeoff that the optimization model takes into account relates to profit margins. Not all products have the same profit margin. An organization may therefore be able to maximize profits by adjusting the mix of products it sells.

Tradeoffs such as these are interrelated. For example, if an organization desires to increase profits by selling more of a high margin product, the organization will need to consider reducing that product's price to achieve a desired sales volume. Because reducing the product's price will reduce its margin, both demand elasticity and margin effects should be considered.

Tradeoffs are made in view of a number of constraints.

For example, the optimization model generally assumes that the quantities of parts that are available to produce the products is limited. If more of a particular type of part is used to create a high-margin product (as an example), less of that part will be available to create a low-margin product.

The model also generally gives existing orders priority over new orders. An organization will damage its reputation if it is not able to meet its existing commitments.

Even if a portion of an organization's business is not being optimized (e.g., the production of certain products is not being placed under consideration by the optimization model), the requirements of that portion of the business must still be taken into account. For example, if a non-optimized portion of the business requires a certain supply of parts, those parts must be deducted from the number of parts that would otherwise be available.

The model is provided with information on the relationships between parts and products. Certain products can be formed using a variety of parts, so the optimization model can identify part substitution schemes that maximize profit. Other products can be formed only with particular parts.

Temporal limitations on market changes are also taken into account. In general, even if a product's price is lowered, it will take a certain amount of time before the sales volume of the product increases. Prices require a certain amount of time before they can penetrate the market. The optimization model may therefore impose limits on how much prices and sales quantities can change.

Another constraint that is preferably taken into account relates to the interrelationships of prices for different products. For example, it is generally not acceptable from a business perspective for an organization to sell a premium product for less than it sells a regular product. This imposes a price restriction on the premium and regular products.

The optimization model preferably allows an organization to manage risk. Pricing decisions carry risk. For example, if it is desired to increase sales for a particular product by lowering price, there is a risk that the lowered price will reduce per item revenues without producing the expected increase in sales volume. Sales volumes are affected by a variety of factors, which may outweigh the organization's pricing decision.

To manage risks such as these, the optimization model can produce both suggested optimum prices and error estimates. This data provides price managers information that can be used to quantify the amount of risk to profit that is associated with adopting a proposed optimum price. As a default, the optimization model accepts an average amount of risk when computing optimum prices. If desired, the optimization model may allow an organization to take a more conservative or a more aggressive stance when calculating the suggested optimum price. Sales may also be ramped-up or ramped-down more aggressively if desired. This may be achieved by relaxing default week-to-week price change limits imposed by the optimization model.

The optimization model preferably produces suggested prices for each product under consideration. The suggested price for each product will shape its demand so as to produce an optimum overall profit level.

Products may be organized in sets called product classes. Not all products need be placed under consideration when running an optimization. For example, certain products can be left out of consideration. The products that are not considered (the non-optimized product classes) still consume the resources of the organization, but their production levels are considered to be constant. Similarly, not all customers need be included in an optimization. The class of customers that is included in the optimization process is called the optimized demand class.

The optimization model preferably produces optimized prices for each optimized product class and the optimized demand class. Taken together, this set of optimized prices is expected to maximize the organization's revenue.

Price range and error estimates may be provided as part of the optimization model's results. For example, the model may produce a range of suggested prices that falls within a single standard deviation of the expected optimum price. Error estimates may be generated to provide a user with an indication of the magnitude of risk involved with adopting the proposed prices.

The quantity of each product that is expected to be sold at its suggested price may be provided to the user. The model ensures that the expected product quantities may be produced by a feasible production plan. The quantities and prices may be considered to be an optimized forecast.

The forecasted prices and quantities for each non-optimized product class and demand class combination may be generated by the model.

A high level production plan may also be generated. The production plan specifies how available parts can be used to produce the products needed to fulfill existing orders, forecasted commitments to non-optimized demand classes, and optimized projections for optimized demand classes.

If desired, the optimization system may generate information on the marginal value of various parts. This allows a user to determine the amount that a specific part contributes to total revenue. This also allows the user to determine whether one part is more valuable than another.

The optimization system captures both supply-side and demand-side effects. On the demand side, the system preferably supports a variety of demand elasticity models. These models represent sales volume (e.g., sales volume in any given week or other suitable time period) as a function of sales price.

On the supply side, the system preferably operates using a number of model assumptions which are appropriate for spot markets.

One model assumption is that the production process being modeled is an assembly process. In an assembly process, finished goods are constructed from constituent parts. For example, the finished goods may be printed circuit boards and the constituent parts may be integrated circuits. The assembly process being modeled permits one or more alternate "recipes" to be used in constructing finished goods. For example, alternate bills of material may be used to assemble a given finished good. A circuit board might, as an example, be assembled from different groups of integrated circuits.

Another model assumption relates to manufacturing lead time. In particular, the optimization model of the invention assumes that the manufacturing process being modeled has a short lead time. The optimization model operates over a particular period of time appropriate for a spot market (e.g., a short period of time such as one week, two weeks, three weeks or less, etc.) This short time period is sometimes referred to as the optimization horizon. The short lead time of the model is significantly less than the optimization horizon. For example, the lead time may be 5% or less of the optimization horizon.

Another model assumption relates to manufacturing capacity. In particular, the model assumes that production capacity is essentially unlimited (e.g., due to external limits such as labor constraints and machine capacity). The quantity of finished goods that can be produced is only limited by the quantity of parts that are available in the short lead time covered by the model.

Spot markets exist for a variety of products. As an example, spot markets exist for commodity products such as meat. Much of a meat packer's capacity is sold in advance under long term contracts. Meat that has not been sold in this way must be sold on the spot market.

There are many ways to construct meat products. For example, a meat packer can select from different varieties of cattle. The packer can also decide what trim level to use for each cut of meat (i.e., with or without bone). The yield (percentage of meat) for each cut can be adjusted. Typically meat is sold in boxes each of which contains a single type of cut. By varying the production process, the cut of meat can be adjusted, making a different product with the same supply material. Additional flexibility is provided by the ability to downgrade certain cuts. For example, prime beef can sometimes be downgraded and sold as choice beef.

In general, an organization obtains parts and produces products from the parts. The products can be produced in a variety of ways. For example, product 1 can be produced using parts A, B, and C or parts B, C, D, and E, whereas product 2 can be produced using parts X, Y, and Z or parts Y and W.

In a salvage industry such as the meat packing industry, the parts that are assembled to produce the products are sometimes referred to as generic pieces. Generic pieces are the smallest (indivisible) components that are produced during the salvage, or deconstruction, process. The products are formed from groups of generic pieces with certain processing attributes applied. For example, in the meat industry the generic pieces are typically the individual muscles of the slaughtered animal, and the production processes may include trimming surface fat to a specified thickness.

In other industries, there are other structural relationships between parts and products. For example, an assembled circuit board might be produced using an unpopulated circuit board and a variety of chips. The parts in this type of scenario are the unpopulated circuit board and the integrated circuits chips. The products are the assembled circuit boards. The organization in this example (e.g., a board assembly factory) has flexibility in determining which boards to produce. For example, with a given supply of unpopulated boards and a given supply of premium chips and regular chips, the factory has the ability to produce more premium boards and fewer regular boards or fewer premium boards and more regular boards.

The optimization system of the present invention preferably represents the complex interrelationships between parts and products using one or more tables or other suitable data structures. These data structures are used to represent the relationships between each product's bill of materials and the parts that are available to the organization. By capturing the structural relationships between parts and products, the optimization system can take into account the tradeoffs involved when deciding what quantities to produce of each product.

In general, the optimization system may be used with any type of industry. The use of the optimization system to optimize profit in the meat packing industry is used as an example.

An illustrative system environment in which an optimization tool in accordance with the present invention may be implemented is shown in FIG. 1. System 10 preferably has one or more databases 12 that are populated using various tools. Databases 12 can be implemented on any suitable computer equipment. For example, databases 12 can be implemented on personal computers, servers, clusters of servers, computers that are networked together at a central location, computers that are located at remote locations and that are networked using a wide area network such as the internet, or any other suitable computing equipment arrangement.

Structural attribute and supply data extraction tools 14 are used to create database entries related to the bills of material used to assemble products from parts. Tools 14 may be used, for example, to create tables that specify which parts are used in each product. If desired, tools 14 may be used to handle multiple layers of bills of material (e.g., bills of material for products, bills of material for components for the products, and bills of material for the parts that are used to form the components).

Data can be entered manually by a user associated with an organization. For example, the structural relationship between a product and its constituent parts may be represented by a table of entries that are manually typed in by a user. Alternatively, or in combination with manual entry techniques, tools 14 can be used to support automatic extraction features. With automatic extraction, existing databases (e.g., bill of material databases already in use by an organization) may be processed automatically to extract structural relationship information.

Demand estimation tools 16 may be used to generate product demand curves. A demand curve for a given product (product class) captures the expected sales quantity (Q) for that product versus sales price (P). Tools 16 may include regression analysis tools that fit linear curves, exponential curves, and other suitable curves to sales data. A user can supply tools 16 with the sales data in the form of one or more tables (e.g., tables in one or more data files).

The user can preferably use tools 16 to specify which type of demand curve model is desired (e.g., linear or exponential). Tools 16 then fit the selected curve type to the sales data. A demand curve is typically produced for each product class to be optimized.

User inputs to the profit optimization system can be supplied by a user at user computing equipment 26. Computer equipment 26 may be a personal computer, networked computers, or any other suitable computing equipment on which software models can be run. The computing equipment 26 may be the same computing equipment that is used to implement other system components (e.g., databases 12, demand estimation tools 16, and tools 14), or different computers can be used for different components.

The computing equipment of FIG. 1 includes storage (e.g., volatile and non-volatile memory) and processing circuitry (e.g., microprocessors). The computer equipment runs code (instructions) to implement the optimization methods of the present invention.

Optimization model 28 includes a user input interface 30 and a model core 32. User input interface 30 displays model results to the user (e.g., on a monitor in equipment 26) and gathers input from the user (e.g., through mouse clicks and keyboard entries). Model core 32 implements the demand and supply sides of optimization model 28 in an integrated fashion.

Databases 12 include structural attributes and other supply model data 18. Data 18 may be produced by tools 14. An example of data 18 is the bill of materials data for an organization that specifies how that organization's products are assembled from various parts. This data serves to define and restrict how the product mix sold by the organization can be varied given current parts availability. For example, if more of a particular part is required to produce product A than to produce product B, it may not be possible to sell too much of product B. This restriction is imposed by the structural attribute and other supply model data 18.

Another example of data 18 is data that captures parts availability information. Parts availability data may include data on which parts are available and what quantities of parts are available for production. Data 18 also preferably captures information on preexisting contractual commitments and finished goods in inventory at the beginning of the model optimization horizon.

Data 22 includes demand model data such as the demand curve data generated by demand estimation tools 16. Demand model data 22 may be stored in any suitable format. For example, a linear demand curve can be represented as a slope and intercept value or can be represented using a look-up table of price and quantity values.

User input data and business rule data 20 includes user-supplied settings from user input interface 30. User-supplied settings include parameters quantifying the amount of risk that the user desires to accept during optimization modeling and bounds on quantity and price within which the optimization operates. Data 20 also includes business rules. The business rules may include default business rules that are built into the system and business rules supplied by a user through user input interface 30. Typical business rules impose restrictions such as restrictions governing the relative prices of various products. A user-supplied or default business rule in the meat packing industry might, as an example, specify that a high grade of beef such as beef labeled "prime" must always be sold at a price higher than a comparable beef product labeled as "choice."

Model results 24 are generated by running the optimization model 28. Typical model results include suggested prices for an organization to use in selling products in various product classes. For example, if there are three products involved in an optimization scenario, model results 24 will include three suggested prices. The optimization model 28 ensures that there is a feasible production plan available for any proposed prices. For example, the model 28 will not suggest a price for a product that is so low that the expected quantity demanded for the product would exceed production capacity.

Model results 24 may be provided to a user using any suitable format. For example, results 24 can be provided in a printed report prepared by equipment 26, in a graph, table, or other format displayed on a computer monitor in equipment 26, in a database file maintained in databases 12, etc.

In the meat packing industry and other commodity industries, the materials from which products are constructed are natural raw materials (e.g., cattle, grain, etc.). Natural materials are subject to variations and therefore have attributes. Some attributes are associated with quality while other identify intrinsic characteristics of the material. The materials from which the products of a meat packer are constructed include different types of cattle.

Figure 3:
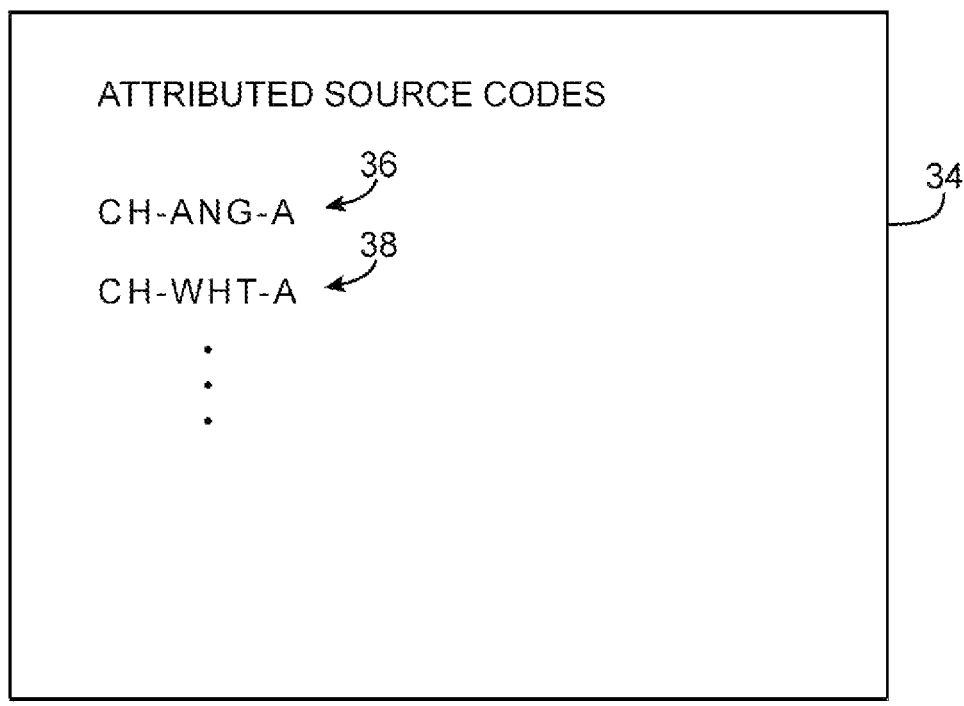
FIG. 3 is an illustrative list of attributed source codes that may be used in the meat packing industry to identify the source of a cut of meat in accordance with the present invention.

A commodity manufacturer may use attributed source codes to identify input materials. An illustrative list of attributed source codes 34 for a meat packer is shown in FIG. 3. Each attributed source code includes three quality attributes that specify the quality of the generic part being used. The first attribute in the example of FIG. 3 is the grade of meat (i.e., "CH" for choice, etc.). The second attribute is a breed attribute, e.g., "ANG" for Angus and "WHT" for White or non-Angus. The third attribute is a size attribute. In the example of FIG. 3, the attributed source code 36 includes grade code "CH", program code "ANG", and size code "A". Attributed source code 38 has grade code "CH," program code "WHT", and size code "A." The quality attributes of a product can create constraints on its sales price. For example, business rules often require that the price of one grade of meat must be higher than the price of another grade of meat.

Companies in a salvage industry may use generic assembly codes as product templates. Each generic assembly code contains a number of generic piece parts and an associated quantity.

Figure 4:
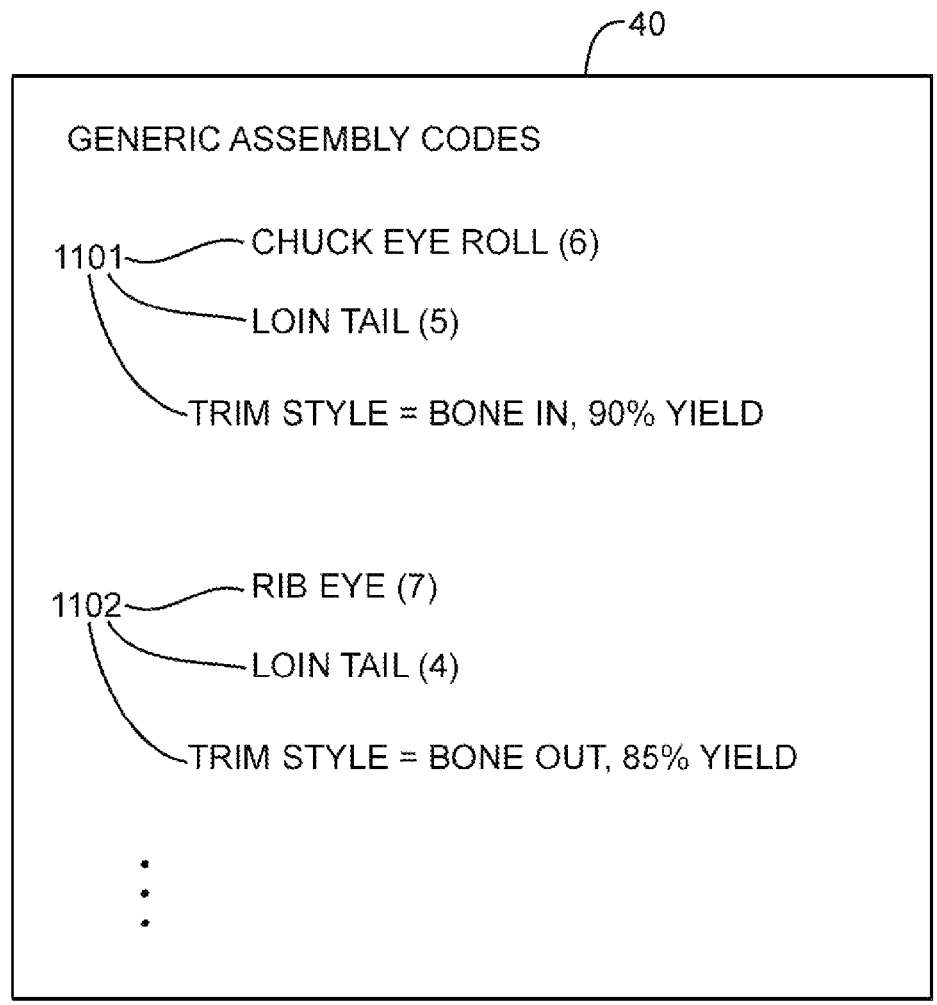
FIG. 4 is an illustrative list of generic assembly codes that may be used in identifying different types of meat products in the meat packing industry in accordance with the present invention.

An example is the meat packing industry. An illustrative list of generic assembly codes 40 is shown in FIG. 4. Each generic assembly code also includes trim specifications such as trim style (BI for bone in or BO for bone out) and a trim yield (e.g., 80% meat, 90%, etc.). In the example of FIG. 4, generic assembly codes 1101 and 1102 are used to specify two respective product templates.

Lastly, commodity manufacturers may use generic piece codes to represent parts. An illustrative list of generic piece codes for meat packers is shown in FIG. 2. Each generic piece code has a one-to-one association with a most granular cut of meat. For example, CHUCK EYE ROLL and LOIN TAIL are two examples of generic piece codes.

For a salvage industry, the Cartesian product of all attributed source codes and all generic assembly codes represents the matrix of all possible attributed assemblies, or simply "assemblies". Not all of these combinations may be physically or economically feasible to produce. Typically only a subset of the entire matrix is recognized as valid output of the manufacturing process.

Using the attributed source codes of FIG. 3 and the generic assembly codes of FIG. 4, meat packers define various groups of parts called assemblies that they may produce. Assemblies are intermediate collections of parts that form the basis for the products sold by the meat packers. A list of illustrative assemblies 42 is shown in FIG. 5. As shown in FIG. 5, each assembly is made up of a attributed source code and a generic assembly code. For example, the first row of list 42 contains the assembly code "CH-ANG-A; 1101". This code defines a product made up of CH-ANG-A meat having the cut and trim characteristics defined by generic assembly code 1101. The codes in the rows of list 42 may therefore be thought of as assemblies in that they define a set of meat assemblies.

Using the attributed source codes of FIG. 3 and the generic piece codes of FIG. 2, meat packers define granular cuts defined as "parts." For example, Chuck Eye Roll-CH-ANG-A and Chuck Eye Roll-CH-WHT-A are parts.

Each assembly and part (i.e., each row in the table of FIG. 5 and FIG. 6) may be assigned an assembly code and part code respectively. A table such as table 42 of FIG. 7 or other suitable data structure may be used to map part codes to assembly codes. This mapping specifies how each assembly is constructed from its constituent parts.

The finished products that the meat packer or other organization will sell can be identified by product codes. Each product code may be associated with one or more assemblies. For example, a product having product code 2233 might be fabricated from assembly 1222 or assembly 3457. A table such as table 44 of FIG. 8 or other suitable data structure may be used to establish the relationships between assemblies and products.

The data structures of FIGS. 2-8 are examples of structural attributes 18 (FIG. 1) that define how products can be formed from parts. The data structures of FIGS. 2-8 may be used in the meat industry and are provided as an example. In general, the invention applies to many other industries.

As shown in FIGS. 2-8, the possible makeup of each product is specified in terms of intermediate assemblies and the parts that can be used to make up the assemblies. Supply model data 18 such as parts availability data is used in conjunction with the structural attribute data to define the supply options available to the meat packer or other organization. Because the components of each product are specified by the data 18, the optimization model 28 is able to take account of the parts consumption tradeoffs involved in constructing one product versus another. In general, any product can be manufactured, provided that there are sufficient parts available and provided that bill-of-materials tradeoffs are taken into account.

The data structures described in connection with FIGS. 2-8 are merely illustrative and are provided as an example in connection with the meat packing industry. Any suitable data structures may be used to define the relationships between products and their constituent parts. Each different industry typically has its own conventions for describing parts, one or more optional intermediate-level part groupings (e.g., assemblies), and final products. The optimization model system of FIG. 1 preferably is constructed to use data structures and nomenclature that is compatible with industry conventions when feasible.

Figure 9:
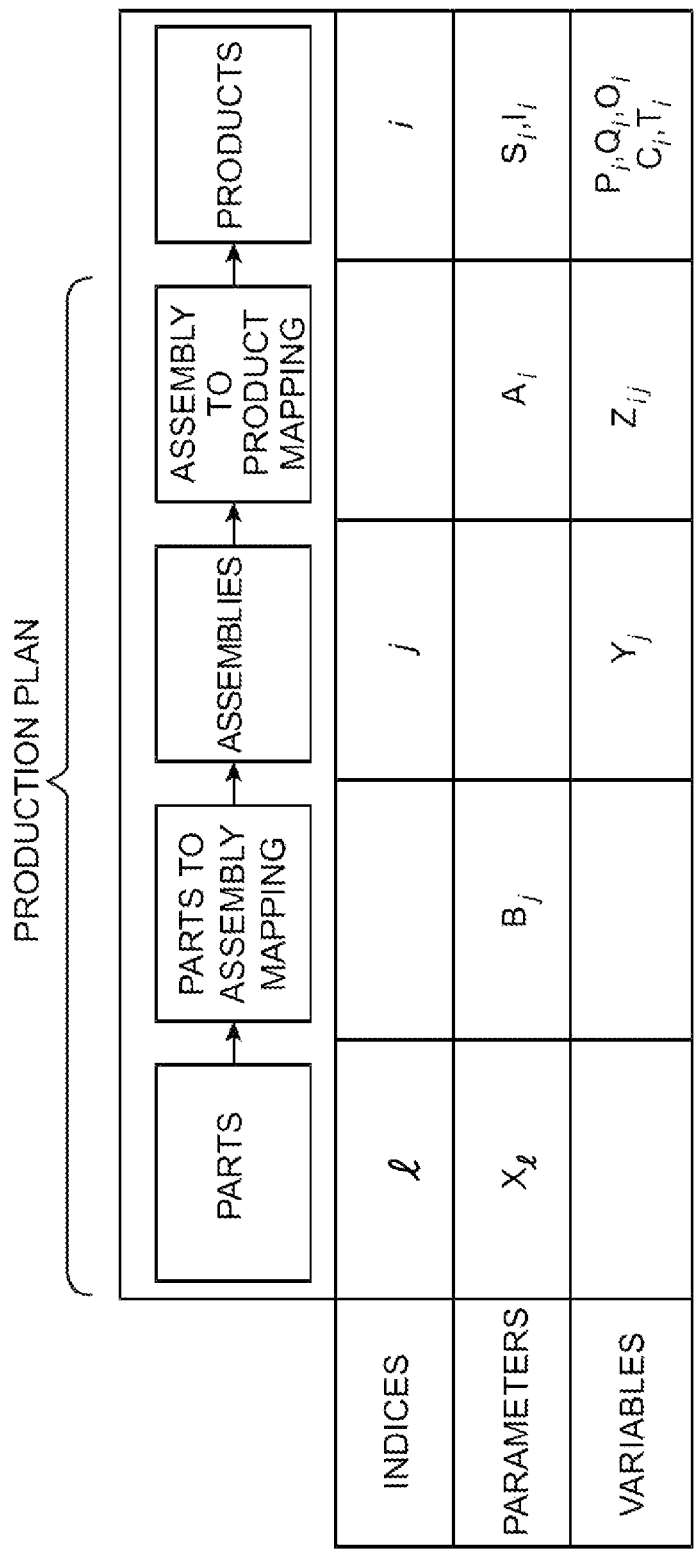
FIG. 9 is a diagram showing the interrelationships between parts, assemblies, and products and associated modeling nomenclature used in the optimization model in accordance with the present invention.

FIG. 9 is a diagram showing the supply-side indices, parameters, and variables used by the optimization model 28 in relation to the data structures described in connection with FIGS. 2-8. Parts, assemblies, and products (product classes) are represented by indices l, j, and i, respectively. For example, the proposed spot sales price for product i is $P_i$ and the projected spot quantity of product i that will be sold on the spot market at price $P_i$ is $Q_i$.

Parameters are generally fixed. Parameters $X_l$ represents the quantity of parts l that are available. Parameters $B_j$ are used to define a parts-to-assembly mapping of the type described in connection with FIG. 7. Parameters $A_i$ are used to define an assembly-to-product mapping of the type described in connection with FIG. 8. For product i, $S_i$ and $I_i$ represent sold (also sometimes called committed) products and starting inventory amounts, respectively.

Variables are used to define the price and quantity of each product. Variables are not fixed. Rather, during optimization, model 28 determines an optimum set of values for the variables that will maximize profit subject to certain constraints. Variables $Y_j$ are associated with assembly quantities. Variables $Z_{i,j}$ are used to express the production plan for the organization. When optimization is complete, the production plan information represented by variables $Z_{i,j}$ and the other production plan indices, parameters, and variables shown in FIG. 9 can be used to implement a production plan. The plan may be used to guide the organization in producing desired quantities of each product. If desired, an organization can use the optimization model 28 without relying on the production plan.

The last row of the last column of the table of FIG. 9 contains the remaining model variables: $P_i$ (price for product i), $Q_i$ (quantity for product i), $O_i$ (oversold quantity for product i), $C_i$ (price cut required for product i to conform to the business rules 20), and $T_i$ (the total quantity of product i for all demand classes combined).

When using model 28, it is not generally necessary or desirable to perform optimization operations for all customers and all product classes. The scope of optimization is therefore typically limited to certain demand classes and certain product classes. Demand classes may be defined based on any suitable criteria. For example, demand classes may be formed from customers located in certain geographic regions, customers with certain pricing policies, etc. The demand classes to which products are sold that are included in the optimization are referred to as optimized demand classes.

It is also not necessary to perform optimization operations for all products. Rather, an organization can leave some products out of the optimization, thereby simplifying the optimization process.

Although model 28 can perform optimization operations for a subset of demand classes and a subset of an organization's products, the model 28 should still satisfy the expected sales for the remaining demand classes and unoptimized products. This ensures that the organization will preserves its business reputation and satisfy its customers.

Figure 10:
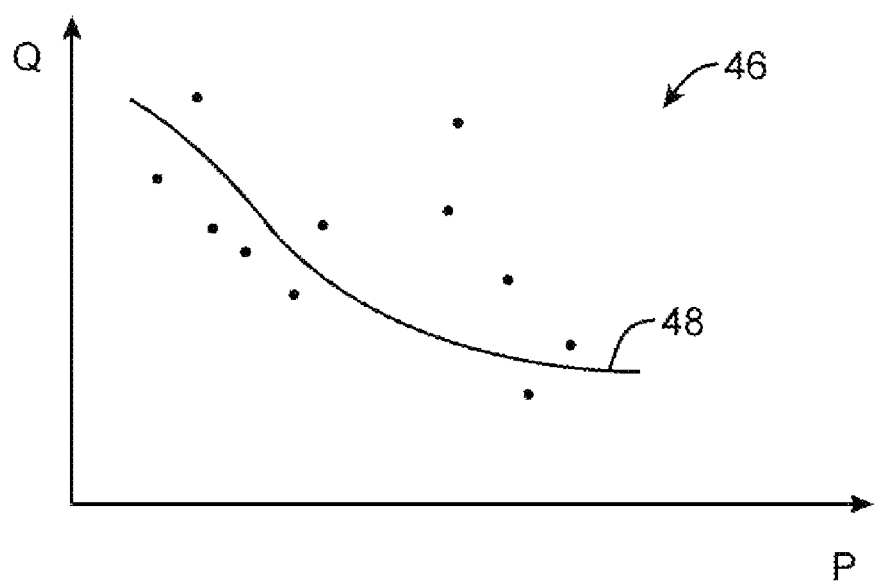
FIG. 10 is a graph of historical sales data showing how a demand modeling tool may be used to extract a demand curve from sales data in accordance with the present invention.

Before optimization results can be calculated by model 28, tools 16 are used to characterize demand for the organization's products. An illustrative quantity versus price graph for a particular product is shown in FIG. 10. The data points in graph 46 represent actual sales data. For example, if the organization sold a particular quantity of the particular product at a particular price, the data point for that sale would be represented by a point having a horizontal axis value equal to the sales price per unit and a vertical axis value equal to the sales quantity for the product at that price. The sales data may be obtained by mining the organization's databases or from any other suitable source.

After obtaining the sales data, the demand extraction tools preferably perform regression analysis or use other suitable techniques to fit a demand curve 48 to the sales data. Any suitable type of modeling analysis may be used to fit the demand curve. Any suitable formulation may be used for the demand curve (e.g., linear, exponential, etc.). The form of the demand curve may be user selectable (e.g., using user input interface 30 of FIG. 1).

Figure 11:
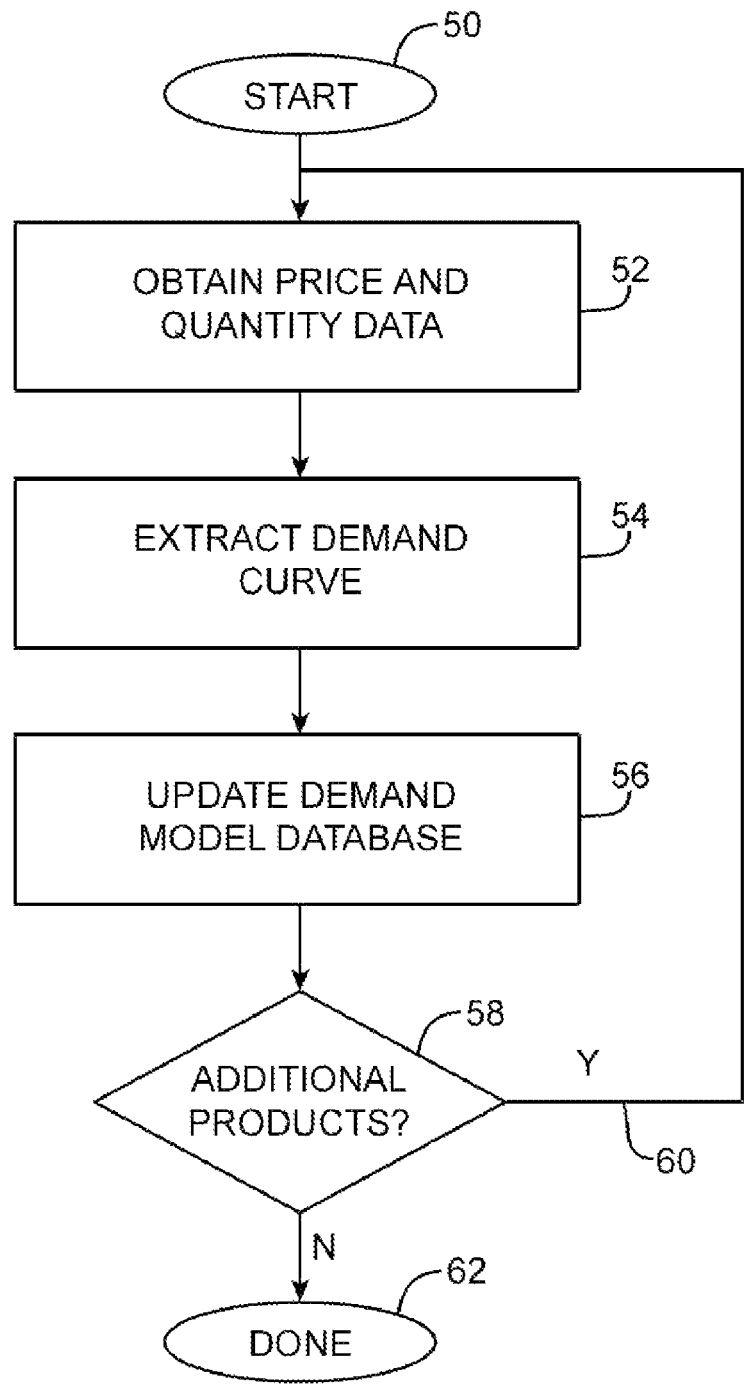
FIG. 11 is a flow chart of illustrative steps involved in extracting a demand curve for a product from sales data of the type shown in FIG. 10 in accordance with the present invention.

Illustrative steps involved in producing demand model data from sales data such as the sales data of FIG. 10 are shown in FIG. 11. Processing is initiated at step 50. At step 52, demand estimation tools 16 obtain sales data. The sales data may be obtained, for example, from sales databases maintained by the organization and/or external sales databases. Both sales of the organization and sales by third parties may be included in the sales data.

At step 54, tools 16 fit a demand curve such as curve 46 of FIG. 10 to the data for a particular product. At step 56, the tools 16 update databases 12 with information on the extracted demand curve. For example, if tools 16 are fitting a linear demand curve function to the data, tools 16 may provide a demand curve slope and intercept to demand model database 22.

After the demand model data has been updated to reflect the newly extracted demand curve, tools 16 determine whether additional demand curves remain to be extracted. If additional demand curves are to be extracted, processing loops back to step 52, as shown by line 60. During each pass through the loop of FIG. 11, a demand curve can be extracted for a different product. When demand model data has been extracted for all products, demand curve processing is complete (step 62). The optimization model 28 can then use the demand model data 22 that has been created. The remainder of databases 12 are populated using tools such as tools 14 and user input interface 30.

The optimization model 28 (FIG. 1) uses a series of econometric and supply balance equations and computes optimum sales prices for the products of each of the optimized product classes. In order to find the optimum solution, optimization model 28 uses techniques such as those based upon the reduced gradient method, Newton's method, barriers/penalty methods, or other such techniques to search the space of all solutions without a need to evaluate each and every possible solution. The model 28 is described in the context of the meat packing industry as an example. In general, any suitable spot market may be modeled by model 28. The horizon for optimization by model 28 is preferably a single time period of variable length.

Three primary sets of indices are used in the model equations. The set of indices {i} represents product classes (products). In general, only a subset of product classes are optimized for prices. The set of indices {j} represents assemblies. The set of indices {l} represents parts.

All variables used in model 28 are non-negative. The variable $P_i$ is the spot price per unit for optimized product class i for the optimized demand class that is ordered and delivered during the spot sales period. While the notation suggests a single demand class for simplicity of exposition, the formulation includes optimization of multiple demand classes simultaneously. The variable $Q_i$ is the spot quantity for optimized product class i for the optimized demand class that is ordered and delivered during the spot sales period. The variable $T_i$ is the spot quantity for product class i for all demand classes combined. The variable $O_i$ is the quantity for product class i that has been oversold for any demand class. By including variable $O_i$ in the model, the amount by which a product class is oversold can be minimized. The variable $Z_{i,j}$ is the quantity of products in product class i that are manufactured using assembly j for any demand class. The values of $\{Z_{i,j}\}$ are used to represent the production plan used by the organization. The variable $Y_j$ is the quantity of assembly j that is manufactured to be used for any demand class.

The variable $C_i$ is the price cut required to conform to the business rules. The variable $U_i$ is the unmet lower bound of product class i. Use of the unmet lower bound variable $U_i$ allows for soft enforcement of a required lower bound for sales quantity $Q_i$ of product i.

The data that is used by the model is defined in the form of a number of parameters. The parameter $S_i$ equals the quantity in units of product class i that has been already committed to be shipped in the time period. The parameter $I_i$ equals the quantity in units of product class i that is in the starting inventory for the organization and that is available to be shipped. The variable $A_i$ represents the set of all assemblies j that can be used to produce i. Some of the $\{A_i\}$ may represent assemblies that are downgraded. The parameter $B_j$ represents the set of all parts 1 that are used to form assembly j. The parameter $F_i$ represents the fraction of total production that is used to supply the non-optimized demand classes. The value of $F_i$ may be based on a historical value. The parameter $F_i$ represents the fraction of customer demand that is associated with the non-optimized classes. If desired, the user may adjust the value of $F_i$. The parameter R represents the set of all business rules (e.g., business rules of the form Op(i1, i2), where i1 and i2 are optimized product classes and Op is a binary operator).

In addition to the parameters listed above, the model 28 preferably uses a number of demand model data parameters and user-defined parameters. These demand model data parameters and user-defined parameters preferably include the parameter $E_i$, which represents the standard error in the price econometric model of optimized product class i. The value of $R_i$ represents the risk (profit risk) that a user of the model desires to adopt for optimized product class i. A user can use user input interface 30 to adjust the value of $R_i$ to make the model more risky or more conservative, as desired. Parameter $PB_i$ represents the base price for optimized product class i. This serves as a baseline forecast for the optimal price. The parameter $QPB_i$ represents the base quantity for optimized product class i, which serves as a baseline forecast for the optimized quantity. The parameter $PUB_i$ is the upper bound on the price for optimized product class i. The parameter $QUB_i$ represents the upper bound on the quantity for optimized product class as a fraction of the total reference quantity. The parameter $PLB_i$ represents the lower bound on the price for optimized product class i. The parameter $QLB_i$ represents the lower bound on the quantity for optimized product class I as a fraction of the total reference quantity. The parameter M represents a total reference quantity. The parameter $\alpha_i$ is the demand elasticity parameter for product class i. The parameter $X_l$ represents the availability of parts l. Parameters $R_i$, $PUB_i$, $QUB_i$, $PLB_i$, and $QLB_i$ can be adjusted by the user (e.g., using user input interface 30 of FIG. 1) to change the characteristics of the model 28.

The model uses equations 1-13.

For all optimized product classes i, equation 1 defines how much quantity is produced to be sold to one or more demand classes. The summation is taken over all j.

$$\Sigma Z_{i,j} - S_i + O_i + I_i = T_i \quad (1)$$

Equation 1 serves to quantify the principle of conservation of materials. The first term represents the amount of product that is allocated for sales. The term $S_i$ represent the amount of product that is already committed (and therefore not available to be sold). The parameter $O_i$ represents the amount by which the product is oversold. The term $I_i$ represent inventory. $T_i$ represents the total product quantity.

For all unoptimized product classes i over all demand classes, equation 2 ensures that sufficient quantity is produced to satisfy existing orders. The summation in equation 2 is taken over all j.

$$\Sigma Z_{i,j} - S_i + O_i + I_i = 0 \quad (2)$$

For all assemblies j, equation 3 defines the alternate bills of materials.

$$Y_j = \Sigma Z_{i,j} \quad (3)$$

The summation in equation 3 is taken over all i such that j is in $A_i$.

For all parts l, equation 4 defines each bill of material.

$$X_l \geq \Sigma Y_j \quad (4)$$

In equation 4, the summation is over all l in $B_j$. The term on the left side of equation 4 is a measure of availability, whereas the term on the right side of equation 4 takes account of production.

For all optimized product classes i, equation 5 defines how much of the production will be allocated to sales to the optimized demand class.

$$T_i * (1 - F_i) = Q_i \quad (5)$$

For all optimized product classes i, equation 6 defines the price econometric model $$P_i = \alpha_i (\text{LOG}(Q_i) - \text{LOG}(QPB_i)) + PB_i - E_i R_i - C_i \quad (6)$$

The parameters $\alpha_i$, $QPB_i$, $PB_i$, and $E_i$ are estimated from sales data using demand estimation tools 16. The formula of equation 6 reflects a user's choice of an exponential-form demand curve. If demand is modeled using another formulation (e.g., a linear model), a corresponding formulation for equation 6 can be used by model 28.

Equation 7 defines the business rules which interconnect the price of different optimized product classes.

$$P_i \leq P_{i'} \quad (7)$$

Equation 7 holds for all (i,i') in R.

Equation 8 enforces the upper bound on prices for optimized product classes.

$$P_i \leq PUB_i \qquad (8)$$

Equation 9 enforces the upper bound on quantities for optimized product classes.

$$Q_i \leq MQUB_i \qquad (9)$$

In equation 9, the value of M represents the total quantity sold, whereas the value $QUB_i$ relates to the percentage of the total quantity sold. Equation 9 provides the model 28 with stability and ensures that the model assumptions hold true.

Equation 10 is used to enforce the lower bound on quantities for optimized product classes.

$$Q_i \leq M\,QLB_i - U_i \qquad (10)$$

Whereas equation 9 represents a "hard" upper bound that can be enforced by the organization, equation 10 represents a soft lower bound, as one cannot always force sales of a particular quantity onto the spot market.

The primary objective of the model 28 is to maximize the overall revenue generated from sales of optimized product classes in the optimized demand class, as shown in equation 11.

$$\max \Sigma P_i Q_i \qquad (11)$$

In equation 11, the summation is taken over all optimized product classes i.

Secondary objectives of the model 28 involve minimizing oversold quantities and minimizing the unmet lower bound quantities. This is represented by equations 12 and 13, where the summations are taken over all optimized product classes in the optimized demand class.

$$\min \Sigma O_i \qquad (12)$$

$$\min \Sigma U_i \qquad (13)$$

Figure 12:
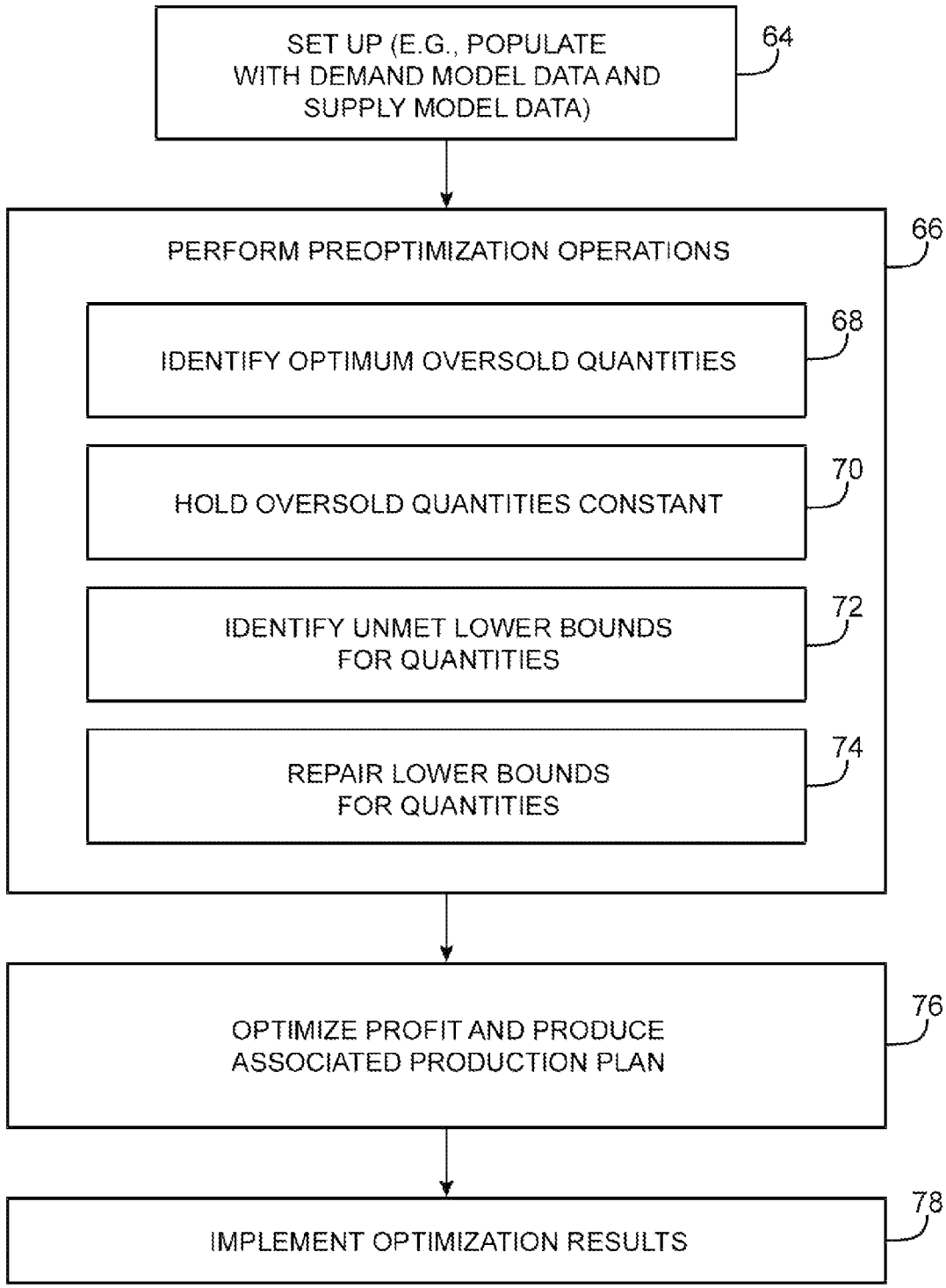
FIG. 12 is a flow chart of illustrative steps involved in using an optimization model to optimize profits in accordance with the present invention.

Illustrative steps involved in using model 28 to optimize the profit for an organization are shown in FIG. 12. During step 64, setup operations are performed. For example, tools 14, 16, and user interface 30 can be used to populate databases 12. Tools 14 may be used to create data structures (structural attributes) that capture the bills-of-material relationships between parts and products in the organization. Tools 14 may also capture other supply model data (e.g., parts inventory data, etc.). Tools 16 may be used to process sales data to produce demand curves for all optimized product classes. User input interface 30 may be used to accept user input. User input may be used to change model parameters and other settings. By changing model settings in this way, a user can make the model more risky or more conservative and can set guidelines for the model that conform with the organization's policies and business goals.

After setup operations have been completed and databases 12 have been populated with appropriate demand model data and supply model data, optimization processing continues at steps 66 and 76. During step 66, the model 28 performs preoptimization operations. The model optimizes profit at step 76.

At step 68 of step 66, the model 28 performs optimization in equation 12, subject to equations 1, 2, 3, 4, and 5.

At step 70, using the results of step 68, the model 28 holds the values of $O_i$ constant for the remaining steps in the procedure. During steps 68 and 70, model 28 determines whether the level of committed sales exceeds parts availability. If the level of committed sales exceeds parts availability, model 28 determines the minimum overall overcommitment level and permits the overcommitment to stay at that and no higher level which allows the model to produce a valid profit maximization result during step 76.

At step 72, the model 28 performs optimization in equation 13, subject to equations 1-5 and 9-10. During step 74, the model 28 repairs the lower bounds $QLB_i$ if necessary. If the lower bounds $QLB_i$ cannot be met using available parts, the operations of steps 72 and 74 will determine the excess amount of sales and will relax the lower bound until the model 28 is assured of being able to produce a valid result at step 76.

After the preliminary optimization operations of step 66 have been performed, the model 28 performs optimization in equation 11 subject to equations 1-10. During step 76, model 28 uses the fixed values of $O_i$ and $QLB_i$ from steps 70 and 74. The model 28 produces model results 24 (FIG. 1) that include suggested sales prices for the optimized product classes and corresponding predicted sales quantities. The organization can then use this pricing information to sell its products (step 78). By using the suggested prices, the organization adjusts the demand for each product according to its demand curve. This ensures that the desired quantity of each product will be sold to maximize revenues and profits.

During step 76, the model 28 ensures that a feasible production plan exists for producing the desired quantities of each product. The user may be provided with access to the model's production plan if desired. The production plan may be provided in any suitable form (e.g., a table of values for the production plan variables shown in FIG. 9. If desired, a user at the organization can use the model's proposed production plan suggestions to help formulate an actual production plan for producing the desired products during step 78.

The foregoing is merely illustrative of the principles of this invention and various modifications can be made by those skilled in the art without departing from the scope and spirit of the invention.

What is claimed is:

1. A method for using a profit optimization model in a computer-implemented system having a microprocessor to allow an organization that assembles multiple products from parts to optimize profit when selling the products, comprising:

populating at least one database with demand model data and supply model data using the microprocessor, wherein the demand model data includes demand curve data for each of the multiple products and wherein the supply model data includes structural attributes that define which of the parts can be used to assemble each of the products; and using the profit optimization model on the computer-implemented system to optimize the organization's profit in selling the products, wherein using the profit optimization model includes identifying which prices are to be used in selling each of the multiple products, wherein the price for each product is identified at least in part using the demand curve data for each product to determine what quantity of each product will be demanded at the price for each product while the supply model data is used to ensure that the quantity of each product that will be demanded at the price for each product can be manufactured using parts available to the organization, and wherein using the profit optimization model further comprises using the profit optimization model to identify which prices are to be used to sell the products based at least partly on structural attribute data defining which parts are used to form each of multiple assemblies and which assemblies are used to form each of the multiple products.

2. The method defined in claim 1 further comprising performing preoptimization operations using the profit optimization model on the computer-implemented system, wherein performing the preoptimization operations includes determining whether committed sales of the products exceed how many products can be assembled from the parts that are available.

3. The method defined in claim 1 further comprising performing preoptimization operations using the profit optimization model on the computer-implemented system, wherein performing the preoptimization operations includes determining whether committed sales of the products exceed how many products can be assembled from the parts that are available and, if the committed sales exceed how many products can be assembled, holding constant oversold quantity variables at levels that allow the profit optimization model to produce a valid profit optimization result.

4. The method defined in claim 1 further comprising performing preoptimization operations using the profit optimization model on the computer-implemented system, wherein performing the preoptimization operations includes determining whether lower bound sales quantities for each product can be assembled from the parts that are available to the organization and, if the lower bound sales quantities for each product cannot be met, repairing the lower bound sales quantities by lowering the lower bound sales quantities to levels that allow the profit optimization model to produce a valid profit optimization result.

5. The method defined in claim 1 wherein using the profit optimization model on the computer-implemented system to optimize the organization's profit comprises producing a production plan using the supply model data and the quantities of each product that will be demanded.

6. The method defined in claim 1 wherein the profit optimization model optimizes spot market profits and wherein the parts available to the organization include parts already in inventory, the method further comprising using the profit optimization model on the computer-implemented system to optimize the organization's profit in selling the products while ensuring that the products can be assembled using primarily the parts already in inventory.

7. The method defined in claim 1 wherein using the profit optimization model further comprises using attributed source codes to specify a quality for a generic part that is used in forming the products.

8. The method defined in claim 1 wherein using the profit optimization model further comprises using generic piece codes, generic assembly codes, and attributed source codes to specify which parts are used in forming the products.

9. The method defined in claim 1 wherein using the profit optimization model further comprises optimizing profit by performing optimization operations on only a subset of the products sold by the organization.

10. The method defined in claim 1 wherein using the profit optimization model further comprises using user-supplied business rules in optimizing the profit.

11. The method defined in claim 1 wherein using the profit optimization model further comprises using user-supplied business rules in optimizing the profit, wherein the user-supplied business rules include at least one rule on the relative pricing of the products.

12. The method defined in claim 1 wherein using the profit optimization model further comprises using the profit optimization model to enforce business rules that require that the price of one grade of meat must be higher than the price of another grade of meat.

13. The method defined in claim 1 wherein using the profit optimization model further comprises using the profit optimization model to enforce business rules that require that the price of one program of meat must be higher than the price of another program of meat.

14. The method defined in claim 1 wherein using the profit optimization model further comprises using risk parameters in the profit optimization model that quantify how much profit risk the organization wants to accept for each product.

15. The method defined in claim 1 wherein using the profit optimization model further comprises:
    using at least one parameter to represent quantities of the products that have already been committed to be shipped; and
    using at least one parameter to represent a starting inventory.

16. The method defined in claim 1 wherein using the profit optimization model further comprises using spot price variables to represent spot prices for the products ordered and delivered during a spot sales period.

17. The method defined in claim 1 wherein using the profit optimization model further comprises using spot quantity variables representing spot quantities for the products ordered and delivered during a spot sales period.

18. The method defined in claim 1 further comprising using demand estimation tools to extract the demand curves from sales data.

* * * * *